Jan. 15, 1946.　　　A. J. LARRECQ　　　2,393,172

SUPERCHARGER CONTROL SYSTEM

Filed July 13, 1942

Inventor:
Anthony J. Larrecq,
by Harry E. Dunham
His Attorney.

Patented Jan. 15, 1946

2,393,172

UNITED STATES PATENT OFFICE 2,393,172

SUPERCHARGER CONTROL SYSTEM

Anthony J. Larrecq, Indianapolis, Ind., assignor to General Electric Company, a corporation of New York Application July 13, 1942, Serial No. 450,821

5 Claims. (Cl. 98—1.5)

In connection with aircraft for operation at high altitudes, for example, altitudes of the order of 8,000 feet and higher, it is known to provide a supercharger for supplying air to the cabin of the aircraft to maintain in the cabin a pressure of a desired value.

My invention relates to the operation and control of such superchargers and has for its object to provide an improved supercharger control system.

For a consideration of what I believe to be novel and my invention, attention is directed to the following specification and the claims appended thereto.

Figure 1:
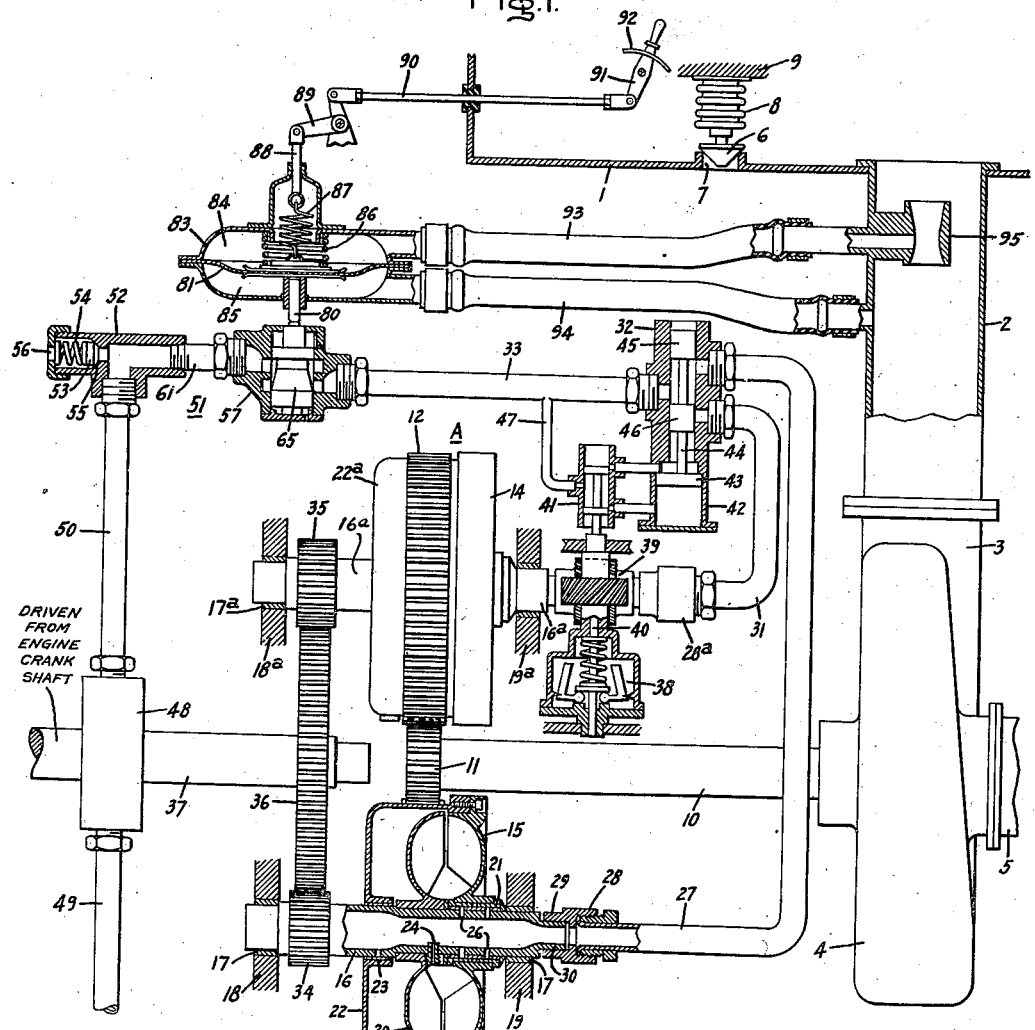
Figure 2:
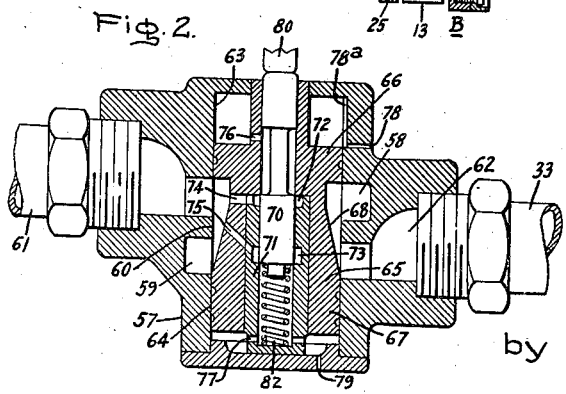

In the drawing, Fig. 1 is a diagrammatic view of a system embodying my invention, and Fig. 2 is a detail sectional view on a large scale of a servo-motor used in the system.

Referring to the drawing, 1 indicates the cabin of an aircraft to which air is supplied through a conduit 2, one end of which opens into the cabin and the other end of which is connected to the discharge conduit 3 of a centrifugal compressor or supercharger 4, the inlet conduit of which is indicated at 5. Conduit 5 may take air from any suitable point, for example, from a ram facing into the slip stream of the aircraft.

The desired pressure is maintained in the cabin by a suitable adjustable automatic discharge valve. This is indicated diagrammatically as comprising valve head 6 controlling an opening 7 in the cabin wall, and having its stem connected to Sylphon bellows 8 which is carried by a fixed support 9 and is subjected to cabin pressure. The cabin pressure acting on bellows 8 collapses the bellows to an extent such that valve head 6 is positioned to permit escape of air from the cabin at a rate to maintain in the cabin the desired pressure. If the pressure in the cabin decreases below the desired value, the discharge valve automatically closes to prevent further escape of air from the cabin. The automatic discharge valve and its manner of functioning form no part of my present invention. Such valves are known. Accordingly, it has been illustrated only diagrammatically. It will be understood that my invention is to be carried out in connection with an aircraft cabin having an automatic discharge valve which functions in the manner indicated and which is capable of being adjusted or which adjusts itself automatically for the desired cabin pressures at various altitudes.

The compressor or supercharger 4 may be of any suitable type, a rotary centrifugal compressor being indicated in the present instance. It comprises a shaft 10 on which is mounted the compressor impeller and which is driven through a gear wheel 11 fixed on shaft 10. Gear wheel 11 meshes with two ring gears 12 and 13 fixed to the driven elements 14 and 15 of two variable speed fluid couplings A and B. The fluid couplings are alike in structure. The coupling B is shown in section and will be described. It comprises a hollow shaft 16 mounted in suitable bearings 17 carried in spaced walls 18 and 19 and on which is fixed the driving member 20 of the hydraulic coupling. The driven member 15 of the coupling is carried on a bearing 21 on shaft 16 and carried by the driven member is a housing 22 supported by a bearing 23 on shaft 16. Gear 13 is carried by housing 22. Fluid, in the present instance oil, is supplied to the coupling from hollow shaft 16 through an inlet opening 24 and it is discharged from housing 22 through a discharge opening 25. At 26 are openings through which oil is fed to lubricate the bearings. Corresponding parts of the other fluid coupling A, insofar as they show on the drawing, have been indicated by corresponding reference characters with the exponent $a$ added.

The fluid couplings are shown diagrammatically. Their specific construction forms no part of the present invention. Such variable speed fluid couplings are known. The speed at which the driving member drives the driven member varies with the amount of oil supplied to the coupling so that by increasing and decreasing the flow of oil to the coupling, the speed of the driven member of the coupling is correspondingly increased and decreased.

Oil is supplied to the interior of hollow shaft 16 through a conduit 27 connected to shaft 16 by a nipple 28 provided with a bearing sleeve 29 in which runs a reduced end 30 on shaft 16. Similarly, oil is supplied to the interior of shaft 16$^a$ through a conduit 31 by a nipple 28$^a$.

Conduits 27 and 31 are connected to the casing of a two-way valve 32 which in one position connects an oil supply conduit 33 to conduit 31 and in the other position to conduit 27. On the left hand ends of shafts 16 and 16$^a$ are pinions 34 and 35 which mesh with a gear wheel 36 carried by a driving shaft 37. Shaft 37 may be driven from an aircraft engine shaft (not shown) through suitable coupling, which means that the driving shaft 37 is driven at variable speeds having no definite relation to the desired supercharger speeds. In other words, the condition obtains that the supercharger, which it is desired to drive at various speeds depending upon the operating conditions of the compressor and the requirements for air for the cabin, is driven from a shaft the speed of which varies in accordance with requirements for driving the aircraft. Pinion 35 is larger in diameter than pinion 34 whereby fluid coupling A gives a lower speed ratio between the driving shaft 37 and the driven shaft 10 than does fluid coupling B.

Two-way valve 32 may be of any suitable construction and operated in any suitable way by means responsive to the speed of the driving shaft, i. e., shaft 37. In the present instance, I have shown valve 32 as being operated by a speed governor 38 driven by gearing 39 from shaft 16ª, shaft 16ª being long enough so that the gearing may be located between wall 19ª and nipple 28ª. Te spindle 40 of the speed governor is connected to the pilot valve 41 of an oil pressure operated servo-motor, the cylinder and piston of which are shown at 42 and 43. The stem 44 of the servo-motor is connected to two valve heads 45 and 46 located in the casing of valve 32 and operating to shut off the flow of oil from supply conduit 33 to conduits 27 and 31, respectively. The valve heads have two positions, the position shown in the drawing wherein valve head 46 covers the end of conduit 31 and valve head 45 uncovers the end of conduit 27 thus connecting supply conduit 33 to conduit 27, piston 43 being in its up position in cylinder 42, and the reverse position wherein valve head 45 covers the end of conduit 27 and valve head 46 uncovers the end of conduit 31, piston 43 being in its down position in cylinder 42. Oil pressure is supplied to the servo-motor by a pipe 47 which connects the pilot valve to oil supply conduit 33.

Speed governor 38 is shown diagrammatically. The arrangement is such that as long as the speed remains below a certain value, the speed governor spring holds the governor weights from flying outward and the pilot valve stands in the position shown in the drawing to admit fluid pressure beneath piston 43 to hold the piston in its upper position. When the speed exceeds such certain value, the governor weights fly outward, moving pilot valve 41 upward to admit oil pressure to the upper end of cylinder 42 to effect movement of piston 43 downward to reverse the positions of valve heads 45 and 46.

Oil pressure is supplied to conduit 33 by an oil pump 48 driven from shaft 37. Pump 48 takes oil from a sump (not shown) through a pipe 49 and discharges it to conduit 33 through a conduit 50 and a pressure relief and regulating valve structure 51. The pressure relief valve comprises a suitable casing 52 having therein a valve head 53 which is biased by a spring 54 against a seat 55. The inner end of valve head 53 is exposed to the pressure of the oil from the pressure oil pump. In case the pressure exceeds a predetermined value, valve head 53 is forced from its seat by such pressure to permit discharge of oil past the valve and out of the end of the valve casing through an opening 56. Thus, the relief valve serves to maintain substantially constant the pressure of the oil supplied by pressure pump 48 to the regulating valve. The regulating valve comprises a casing 57 (see Fig. 2) provided with an annular inlet pressure chamber 58 and an annular discharge chamber 59 separated from each other by a valve seat 60. Relief valve casing 52 is connected to inlet chamber 58 by a conduit 61. Discharge chamber 59 is connected to conduit 33 by a conduit 62. Valve casing 57 is provided with walls which define two spaced cylinders 63 and 64 located at opposed ends of the casing on opposite sides of valve seat 60. In the valve casing is a valve body 65 having at its two ends portions forming pistons 66 and 67 located in cylinders 63 and 64, respectively, and an intermediate portion 68 which forms the valve body proper and which cooperates with valve seat 60 to control the flow of oil from inlet chamber 58 to outlet chamber 59. The valve body is hollow and located therein is a pilot valve 70 which serves to control flow of oil to cylinders 63 and 64. Fixed in the bore of the hollow valve body is a liner 71 which is cut away to provide annular pressure chambers 72 and 73 which are connected to pressure chamber 58 by passages 74 and 75 respectively, and which are covered by the head of pilot valve 70. In the valve body are openings 76 and 77 which communicate with cylinders 63 and 64 and in the valve casing are drain ports 78 and 79 which connect cylinders 63 and 64 to a point of discharge. In the wall of cylinder 63 is a vertical groove 78ª which connects with drain port 78 for flow of oil to it. The ends of pilot valve head 70 cooperate with the adjacent end walls of pressure chambers 72 and 73 to control flow of oil through pressure chambers 72 and 73 and openings 76 and 77 to cylinders 63 and 64. If the pilot valve moves downward the upper end of the head of pilot valve 70 moves away from the upper edge of pressure chamber 72, thus connecting pressure chamber 72 through port 76 to cylinder 63, to admit oil pressure to cylinder 63 behind the piston and effect movement of the piston downward, the piston moving until flow of oil is again cut off by the pilot valve head. Movement of the pilot valve in the opposite direction serves to connect pressure chamber 73 through ports 77 to cylinder 64, thus serving to effect movement of the valve body upward. When the pilot valve is in the position shown in the drawing, flow of oil from pressure chamber 71 to both cylinders 63 and 64 is cut off so that the valve body is stationary. Movement of valve body 65 is limited by pistons 66 and 67 engaging the ends of cylinders 63 and 64. Drain ports 78 and 79 are relatively small in diameter compared to ports 76 and 77 so they do not prevent the building up of pressure in the respective cylinders to effect movement of the valve body; but at the same time, when the valve body is stationary, permit eventually the oil to drain out of the cylinders. This is desirable in order that the valve body may respond promptly to the building up of oil pressure in one or the other of the cylinders.

The outer end of the pilot valve stem projects through the head of cylinder 63 and engages the end of a stem 80 fixed to a diaphragm 81. The pilot valve stem is biased to a position in engagement with the end of stem 80 by a spring 82. Diaphragm 81 is located in a casing 83 and divides the casing into two chambers 84 and 85. In chamber 84 is a compression spring 86 located between diaphragm 81 and the opposed wall of chamber 84, and connected at one end to diaphragm 81 is a tension spring 87, the other end of which is connected to a pin 88 which extends through the wall of chamber 84 and is pivotally connected by a bell crank lever 89 and a rod 90 to a hand control lever 91 which moves over a suitable quadrant 92 so that the lever 91 may be fixed in any adjusted position. By moving hand lever 91, the effective action of spring 86 and 87 on diaphragm 81 may be adjusted.

Chambers 84 and 85 are connected by conduits 93 and 94 to means in conduit 2 which creates a pressure difference which bears a definite relation to the rate of flow of air through conduit 2. Any suitable means may be used. In the present instance, I have shown conduit 93 connected to the throat of a Venturi nozzle 95 and conduit 94 connected to conduit 2 on the up stream side of nozzle 95. Thus, chamber 85 is subjected to the leading or higher pressure of the pressure difference device and chamber 84 to the trailing or lower pressure. The operation is as follows.

Assume that the device is operating, shaft 37 being driven from the engine crank shaft at a certain speed so that the pressure oil pump 48 is supplying oil to the regulating valve, and that the regulating valve stands in an intermediate position, as shown in Fig. 1 for example. Speed governor 38 is shown in a position such that fluid coupling B is connected through valve 32 to oil supply conduit 33 so that the impeller of the supercharger is being driven by the high ratio fluid coupling. The flow of air through conduit 2 to the aircraft cabin sets up a pressure difference in the pressure difference creating device which bears a definite relation to the rate of flow, and diaphragm 81 is positioned accordingly. Oil will be supplied through the regulating valve to the fluid coupling B at a rate such that the fluid coupling effects driving of the supercharger impeller at a speed to give the desired air flow. If now the air flow increases, due to an increase in speed of drive shaft 37 or to other cause, the pressure difference applied to diaphragm 81 is increased, thus effecting an upward movement of the pilot valve 70. Upward movement of pilot valve 70 admits fluid pressure to the underside of piston 67, thus raising the piston to diminish the flow of oil through the regulating valve, the tapered surface of the regulating valve moving closer to the valve seat 60. This effects a decrease in the amount of oil supplied to the fluid coupling and hence a decrease in the speed at which the coupling drives the supercharger impeller. This serves to bring the flow of air back to the desired value. If the flow of air from the supercharger to the cabin decreases below the desired value due to a decrease in speed of drive shaft 37 or to other cause, then a similar operation takes effect except in the opposite direction, the supply of oil to the fluid coupling B being increased to effect increase in the speed at which the fluid coupling drives the supercharger, thus increasing the flow of air to the cabin. Thus, with the above-described arrangement, the flow of air to the cabin is maintained at the desired value by means responsive to the rate of flow of air, which means in turn regulates flow of actuating fluid to the fluid coupling.

Speed governor 38 is driven at a speed which is proportional to the speed of driving shaft 37 (i. e., of the engine crank shaft). When the speed increases beyond a predetermined value, the weights of the speed governor 38 are thrown outward to effect an upward movement of the pilot valve so as to reverse the position of valve heads 45 and 46. This results in cutting off the supply of actuating fluid to fluid coupling B and connecting the supply to fluid coupling A so that at the higher engine or driving shaft speed, the supercharger is driven through the lower ratio fluid coupling. The speed governor 38 is of a type such that it moves throughout its range from the one position to the other upon relatively small change in speed. The arrangement shown is only by way of example. Any suitable rearrangement may be used.

The provision of the two fluid couplings connected to the driving shaft through a speed actuated transfer mechanism amounts in substance to a gear shift means whereby the driving shaft may be connected to the supercharger selectively through either of two available speed gearings.

By adjusting hand lever 91, the operator may adjust the effective action of springs 86 and 87 on diaphragm 81, thus manually adjusting the volume of air supplied by the supercharger to the cabin and in its extreme position lever 91 effects closing of the regulating valve, thus shutting off the supply of fluid to the fluid couplings.

The drawing is diagrammatic. It will be understood that in actual practice the mechanism shown is built into a suitable casing and that the oil which discharges past the relief valve 53 from the fluid coupling and other means is caught in the casing and returned to a sump in the casing and with which the pipe 49 may connect.

What I claim as new and desire to secure by Letters Patent of the United States is:

1. In a control system for an aircraft cabin supercharger, the combination of a supercharger, a conduit for conveying air from the supercharger to the cabin, a driving shaft, a plurality of variable speed means through which the driving shaft drives the supercharger, and means responsive to the speed of the driving shaft for automatically transferring the drive from one variable speed means to another.

2. In a control system for an aircraft cabin supercharger, the combination of a supercharger, a conduit for conveying air from the supercharger to the cabin, a driving shaft, a plurality of fluid couplings through which the driving shaft drives the supercharger, and means responsive to the speed of the driving shaft for automatically transferring the drive from one fluid coupling to another.

3. In an aircraft, the combination of a cabin, a supercharger, a conduit for conveying air from the supercharger to the cabin, an aircraft propelling shaft, means for driving the supercharger from the propelling shaft including a plurality of variable speed means connected in parallel between the propelling shaft and the supercharger, and means responsive to the speed of the propelling shaft for transferring operation from one variable speed means to another.

4. Supercharger arrangement including the combination of a chamber, a supercharger, a conduit for conveying air from the supercharger to the chamber, a driving shaft, first and second means each including a fluid coupling for connecting the supercharger to the driving shaft, a source of operating fluid for the couplings, means responsive to the speed of the driving shaft for alternately connecting the couplings to the source, and means responsive to the flow of air through the conduit for varying the supply of operating fluid to the couplings.

5. Supercharger arrangement including the combination of a chamber, a supercharger, a conduit for conveying air from the supercharger to the chamber, a driving shaft, first and second gear means each including a fluid coupling for alternately connecting the driving shaft to the supercharger, valved conduit means for conducting operating fluid to the fluid couplings, a governing mechanism responsive to speed changes of the driving shaft for controlling the valved conduit means to transfer operation between the gear means, and means responsive to a fluid condition in said conduit for controlling the flow of operating fluid through said conduit means.

ANTHONY J. LARRECQ.